Dec. 18, 1928.
G. W. GRISDALE ET AL
1,695,422
ELECTRIC METER
Filed Aug. 25, 1924   3 Sheets—Sheet 1
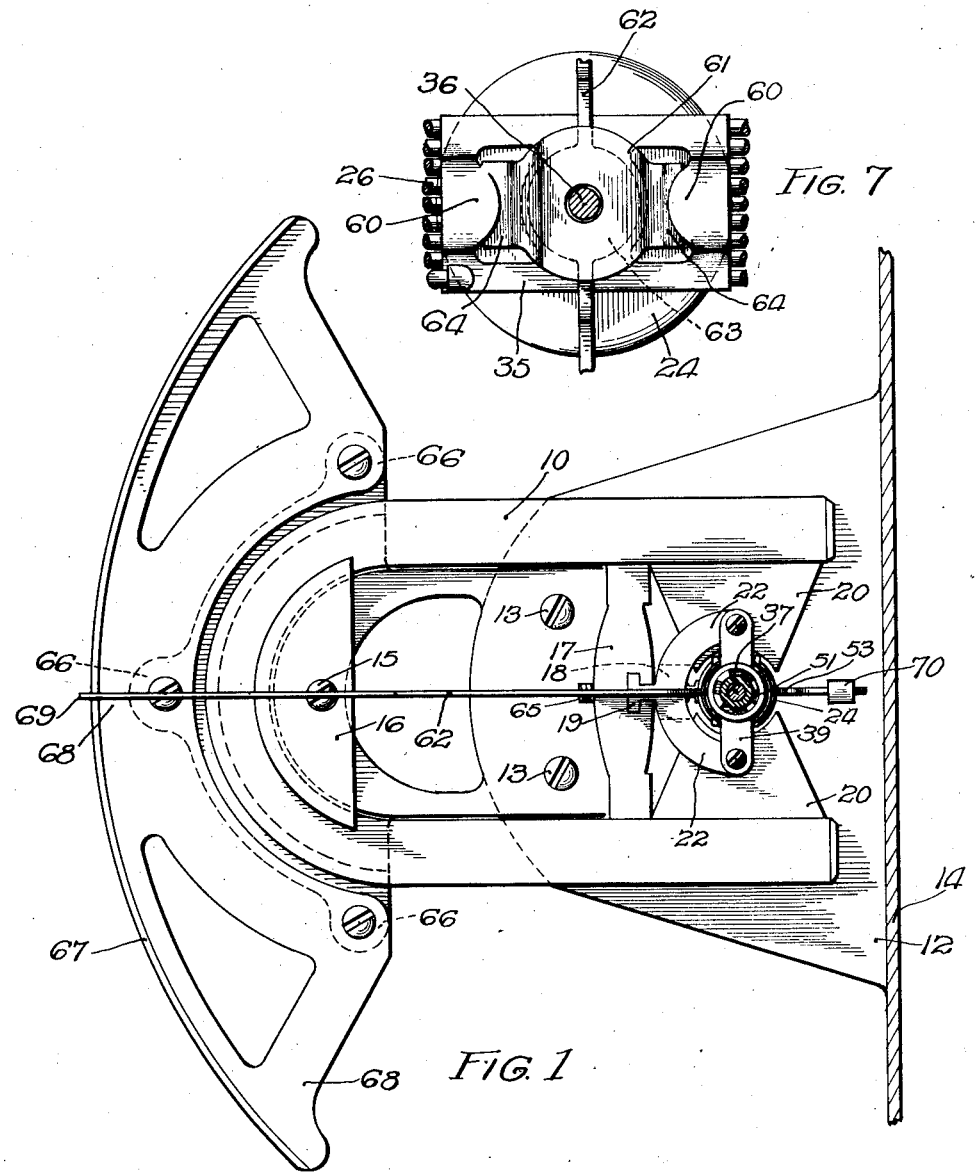
INVENTOR
George W. Grisdale
By
ATTYS.

Dec. 18, 1928.
G. W. GRISDALE ET AL
ELECTRIC METER
Filed Aug. 25, 1924
1,695,422
3 Sheets-Sheet 2
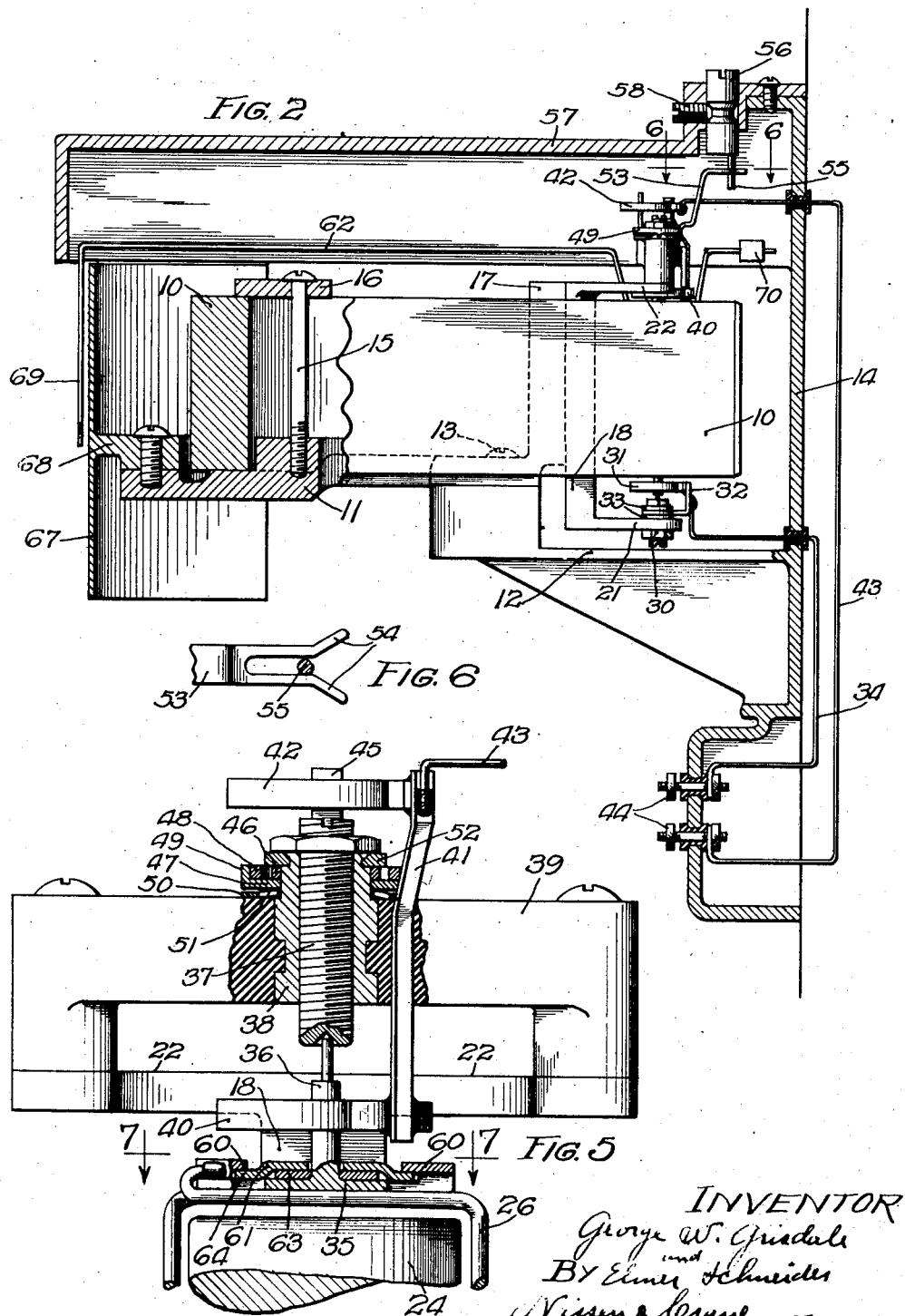

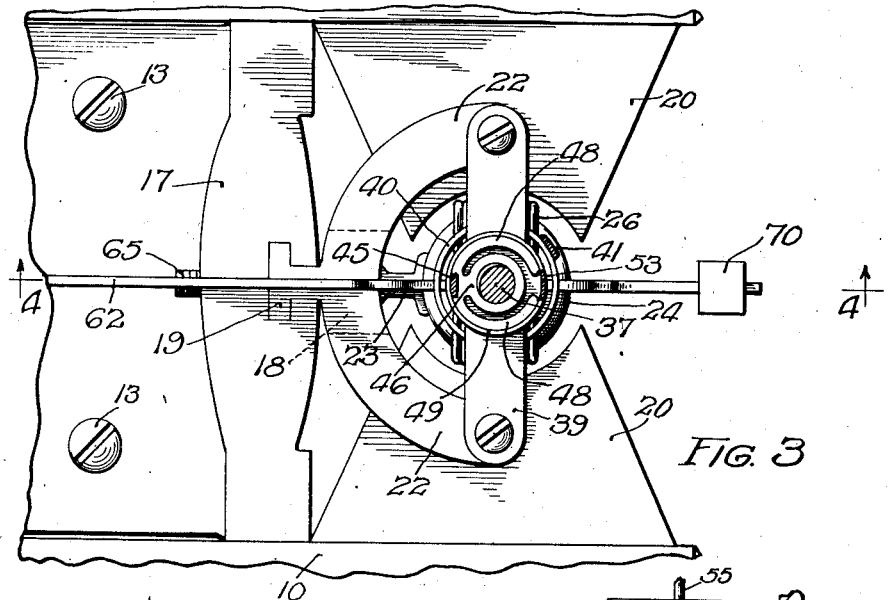

Patented Dec. 18, 1928.

1,695,422

UNITED STATES PATENT OFFICE.

GEORGE W. GRISDALE AND ELMER SCHNEIDER, OF CHICAGO, ILLINOIS, ASSIGNORS TO REPUBLIC FLOW METERS COMPANY, OF CHICAGO, ILLINOIS, A CORPORATION OF ILLINOIS.

ELECTRIC METER.

Application filed August 25, 1924. Serial No. 733,903.

This invention relates to voltmeters of the d'Arsonval galvanometer type and especially to meters of this type used in connection with thermo-couples for pyrometers.

The invention has for its object the provision of a meter in which the parts may be economically manufactured and assembled and in which they may be conveniently and accurately adjusted for assembly, and which shall be of improved construction and operation.

The invention is exemplified in the combination and arrangement of parts shown in the accompanying drawings and described in the following specification, and it is more particularly pointed out in the appended claims.

In the drawings—

Fig. 1 is a horizontal sectional view through one form of instrument embodying the present invention, the section being taken substantially on line 1—1 of Fig. 4;

Fig. 2 is a vertical sectional view through an instrument embodying one form of the present invention;

Fig. 3 is a horizontal section substantially on line 3—3 of Fig. 4;

Fig. 4 is a vertical section showing the galvanometer coil and its supports on an enlarged scale;

Fig. 5 is a vertical section showing the upper bearing for the galvanometer coil on a still larger scale;

Fig. 6 is a fragmentary detail; and

Fig. 7 is a fragmentary top plan view of the galvanometer coil showing the manner of attaching the indicator needle thereto.

The electrical measuring instrument used in connection with thermo-couples for pyrometers is in reality a milli-voltmeter calibrated to read in degrees of temperature, the current being supplied by a thermo-couple which is subjected to the temperature to be measured. The voltmeter is usually of the d'Arsonval type, comprising a coil journaled on jewel bearings between the poles of a permanent magnet. In the present application the invention is illustrated as applied to a meter of the wall type in which the magnet is arranged in a horizontal position, but it will be understood that the invention is applicable to portable meters, recording meters, and a large variety of other forms, as well as to the particular embodiment illustrated in the drawings.

In Figs. 1 and 2 of the drawings the permanent magnet is shown at 10 supported on a base plate 11 of non-magnetic material secured to a bracket 12 by screws 13. The bracket 12 is illustrated as cast integrally with the back plate 14 of the meter. The magnet 10 is rigidly clamped to the base plate 11 by a screw 15 and a clamping plate 16. Adjacent its rear end the base plate 11 is provided with an upright web 17, which is fastened to the poles 20 locking the magnet 10 also forming a support for the coil bracket 18. The bracket 18 is provided with an upright T-head 19 which runs parallel with the axis of the coil 26 and fits in a guide slot cut in the rear face of the web 17, as clearly shown in Fig. 1. The T-head 19 and the guide therefor are accurately machined so as to rigidly and accurately support the galvanometer coil in properly centered relation to the pole pieces 20 secured to the inner faces of the rear ends of the magnet 10. The bracket 18 carries at its lower end a centrally extending arm 21 and at its upper end a pair of laterally curved arms 22. The rear face of the bracket 18 is provided with a pair of rearwardly projecting lugs 23, which have their rear faces curved to receive a cylindrical soft iron core member 24. The core member is held in place against the lugs 23 by a screw 25. The galvanometer coil 26 is supported in position to encircle the core 24 and to rotate about the periphery of the core and within the space between the core and the faces of the poles 20. This coil is made of a number of turns of very fine wire wound upon a form which is removed after the turns are bound to one another by a suitable binding material, such as shellac. A pivot plate 27 is suitably cemented to the lower end of the coil, the plate having a pivot post 28 rigidly secured thereto or formed integrally therewith. The pivot post 28 rests upon a journal screw 29 threaded in the arm 21. The screw 29 is provided with a jewel bearing for the end of the pivot post. A lock nut 30 holds the screw 29 in its adjusted positions in the arm 21. A spiral spring 31 similar to the balance spring of a watch has one end secured to the pivot post 28 and has its opposite end secured to a finger 32. The finger 32 is clamped between insulating washers 33 and a lead wire 34 is soldered or otherwise secured to the finger 32 so as to make electrical connection through the spring 31 and pivot post 28 to the plate 27. One end of the coil 26 is electrically connected with the plate 27 by soldering or other means so that the lead 34 is provided with electrical connection with one end of the coil 26. This connection entering through spring 31 is not disturbed by the rotation of the coil. The spring 31 offers resistance to rotation of the coil so as to return the coil to its zero position after deflection due to current passing through the coil. The top end of the coil 26 is provided with a plate 35 similar to plate 27, and the opposite end of the coil is formed rigidly with the plate 35 and is provided with a bearing set in the lower end of a screw 37. The screw 37 is threaded in a sleeve 38 embedded in a bridge member 39 formed of dielectric material. The bridge member 39 has its opposite ends supported on the arms 22 carried by the bracket 18. A spring 40 similar to the spring 31 is attached to the pivot pin 36 and has its opposite end secured to an upright bar 41. The bar 41 is carried at its upper end by a thermostatic spiral 42. A lead wire 43 is also secured to the bar 41 to form the other connection for the coil 26. The leads 34 and 43 may be carried to suitable binding posts 44 at the lower portion of the supporting plate 14. The leads from the thermo-couple will be attached to the binding post 44. The thermostatic member 42 is supported on an upwardly projecting finger 45 carried on a spring disc 46 supported on a zero adjusting member 47 in a manner best illustrated in Figs. 3 and 5. The disc 46 is provided with spring fingers 48 which resiliently press outwardly against a flange 49 on the zero adjusting member 47 and surrounding the disc 46. This forms a spring frictional engagement between the zero adjusting member 47 and the disc 46 which tends to prevent relative rotation of the disc within the flange 49 but which permits stepless rotation if sufficient force is exerted. To further clamp the disc 46 to the zero adjusting member 47 a washer 50 having upwardly bent spring tongues 51 is interposed between the bridge 39 and the zero adjusting member 47. A washer 52 is riveted to the upper end of the sleeve 38 so that the disc 46 is clamped between the washer 52 and the spring tongues 51 on the washer 50. This further helps in preventing relative movement between the zero adjusting member 47 and the disc 46, but does not provide a rigid connection between these two parts. The member 47 is provided with a zero adjusting lever 53 having its upper end bifurcated, as shown in Fig. 6. The prongs 54 of the lever 53 are arranged on opposite sides of a pin 55 projecting downwardly from a rotary stud 56 secured in the cover 57 for the instrument case by a screw 58, as shown on Fig. 2. The pin 55 is arranged eccentrically on the end of the stud 56 so that when the stud is rotated the lever 53 will be swung laterally. This will cause the finger 45 to move, which motion will be transmitted through the bar 41 to the spring 40 and consequently to the coil 26. In this way if the coil is slightly out of zero position the difficulty may be remedied by rotating the screw 56. The thermostatic member 42 is for the purpose of automatically setting the coil to compensate for atmospheric temperatures. When the instrument is first set up or during subsequent calibration thereof if a larger adjustment of the coil 26 is required than can be secured by the lever 53, this adjustment may be accomplished by shifting the disc 46 relative to the member 47 against the frictional resistance between said members. After the parts are thus shifted they will retain their new relation because of the spring friction provided by the spring arms 48 and the spring washer 50.

The coils 26 are usually made uniform for various styles of instruments and it is desirable to be able to equip a coil with a number of different forms of indicating means. It is also convenient in assembling the parts to be able to place the needle in position indendently of the manufacture of the coil. For this purpose the pivot plate 35, as shown in Figs. 5 and 7, is provided with a pair of bridges or arches 60 struck upwardly therefrom for receiving the ends of a spring retainer plate 61. The indicator needle 62 is provided with an enlarged portion 63 having an opening therein of a size to pass over the pivot stud 36. This enlarged portion 63 rests upon the plate 35 and the spring retaining plate 61 is then moved downwardly over the pivot pin 36 until it engages the upper face of the enlarged portion 63. The projecting ends 64 of the retaining plate 61 are then sprung downwardly and rotated to pass beneath the bridges 60 on the plate 35. This will yieldingly hold the needle 62 in position on the upper end of the coil 36. The indicator may be moved angularly about the pin 36 against the friction due to the pressure of the retainer plate 63 to accurately position the needle relative to the coil. After the parts are in position they are sealed against further movement by any suitable fixing.

It will be apparent that the coil 26 together with its supporting bearings and zero adjusting mechanism constitutes a galvanometer unit all mounted on the bracket 18, and the entire unit may be removed from its position between the magnetic portions 20 by loosening the screw 65 and sliding the bracket 18 upwardly in the guide slot formed for the T-head 19 in the support 17. This guide slot and T-head forms a rigid support for accurately centering the galvanometer coil and its core relative to the pole pieces 20; and since the support extends throughout the length of the coil and core there is no danger of the parts springing laterally to move them out of center either by the exertion of external force or due to the magnetic attraction of the pole pieces. The same base plate 11 which supports the magnet 10 and carries the bracket 18 for supporting the galvanometer coil casing is provided with lugs 66 upon which a scale support 67 is mounted by means of a flange 68 or other suitable means connected therewith. The needle or indicator 62 extends forwardly and is bent downwardly, as shown at 69, to pass over the front face of the dial plate 67. A counter poise 70 is usually provided for the indicator 62.

We claim:—

1. An electrical measuring instrument comprising a magnet having opposed pole pieces, a web of non-magnetic material arranged adjacent said pole pieces and bridging the space between the arms of said magnet, said web being spaced from said pole pieces adjacent the central portion thereof, and a galvanometer element slidably connected with said web and movable into and out of position between said pole pieces.

2. An electrical measuring instrument comprising a magnet, a web of non-magnetic material disposed between the arms of said magnet, a pair of pole pieces connected with the arms of said magnet adjacent said web but spaced centrally therefrom, a galvanometer element disposed between said pole pieces, and a support for said galvanometer element, said support having a longitudinally extending T-head thereon arranged to slide within a slot in said web shaped to conform to said T-head.

3. An electrical measuring instrument comprising a magnet, a base plate of non-magnetic material upon which said magnet is mounted, pole pieces secured to said magnet and having registering faces providing an opening therebetween, a web member bridging the space between the arms of said magnet and extending substantially parallel with the opening between said pole pieces, a galvanometer element slidably connected with said web member for movement into and out of said opening, and a dial plate mounted on the end of said base plate.

4. An electrical measuring instrument comprising a rotary coil, a plate secured to said coil and having a pivot pin projecting therefrom, an indicator having an opening therein for receiving said pivot pin, a resilient lock plate having an opening therein for receiving said pivot pin, and interengaging means on said pivot plate and lock plate for retaining said plates in position relative to one another to yieldingly secure said indicator to said coil.

5. An electrical measuring instrument comprising a rotary coil, a pivot plate attached to said coil and having a pivot pin extending therefrom, said plate having bridges or arches struck upwardly, an indicator having an opening therethrough for receiving said pivot pin, and a spring retaining plate having an opening therethrough for receiving said pivot pin, said retaining plate having tongues thereon for engaging beneath said bridges or arches to yieldingly lock said indicator between said pivot plate and retainer plate.

6. An electrical measuring instrument comprising a rotary coil, a zero adjusting lever for said coil, a connection between said zero adjusting lever and said coil, said connection including a pair of members frictionally held together to cause said coil and zero adjusting lever to move in unison with one another but permitting relative adjustment of said lever and coil if sufficient force is exerted thereon.

7. An electrical measuring instrument comprising a rotary coil, a zero adjusting lever for said coil, and means for connecting said zero adjusting lever with said coil, said connecting means comprising a pair of discs and a spring device for holding said discs in frictional engagement with one another to constrain said coil and zero setting lever to move in unison but permitting relative adjustment thereof.

8. An electrical measuring instrument comprising a rotary coil, a zero setting lever for said coil, a disc connected with said zero setting lever, and a second disc connected with said coil, one of said discs having a flange thereon engaging the periphery of the other of said discs while the disc so engaged is provided with resilient means pressing against said flange.

9. An electrical measuring instrument comprising a rotary coil, a zero setting lever for said coil, contacting discs connected respectively with said coil and lever, and spring means for pressing said discs together to cause them to move in unison but permitting relative adjustment thereof.

10. An electrical measuring instrument comprising a rotary coil, a zero setting lever for said coil, a pair of discs connected respectively with said coil and lever, one of said discs having a peripheral flange thereon for engaging the periphery of the other of said discs while said last-named disc is provided with spring fingers pressing against said flange, and spring means for yieldingly pressing said discs laterally against one another.

11. An electrical measuring instrument comprising a magnet having opposed pole pieces, a non-magnetic bracket secured to said magnet and spaced from said pole pieces, and a galvanometer unit mounted on said bracket and movable into and out of position between said pole pieces, said galvanometer unit comprising a core member, a support for said core member slidably mounted on said bracket, arms carried by said support, pivot bearings mounted on said arms, a coil mounted on said pivot bearings, an indicator, spring means for removably securing said indicator to said coil, a zero setting lever, and a frictional connection between said coil and zero setting lever.

12. An electrical measuring instrument comprising a supporting plate of non-magnetic material, a magnet secured to said plate, pole pieces for said magnet having opposed faces providing an opening therebetween, a bracket on said base plate having a guide slot therein extending parallel with said opening, a galvanometer support slidably mounted in said guide, a galvanometer element carried by said support, said element comprising a rotary coil, an indicator mounted on said coil and having spring means for retaining said indicator on said coil, and a zero setting lever having adjustable frictional connection between said coil and lever.

In testimony whereof we have signed our names to this specification on this 21st day of August, 1924.

GEORGE W. GRISDALE.
ELMER SCHNEIDER.